(12) United States Patent
Coutinho (10) Patent No.: US 12,086,890 B2
(45) Date of Patent: Sep. 10, 2024

(54) SYSTEM AND METHOD FOR GRAPH MODEL COMPUTING

(71) Applicant: ADP, Inc., Roseland, NJ (US)

(72) Inventor: Roberto Coutinho, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 312 days.

(21) Appl. No.: 17/451,054

(22) Filed: Oct. 15, 2021

(65) Prior Publication Data

US 2023/0121966 A1   Apr. 20, 2023

(51) Int. Cl.
| | |
|---|---|
| *G06Q 10/10* | (2023.01) |
| *G06F 16/2458* | (2019.01) |
| *G06F 16/28* | (2019.01) |
| *G06F 16/901* | (2019.01) |
| *G06Q 10/06* | (2023.01) |
| *G06Q 30/02* | (2023.01) |
| *G06Q 30/06* | (2023.01) |
| *G06Q 40/12* | (2023.01) |

(52) U.S. Cl.
CPC ....... *G06Q 40/125* (2013.12); *G06F 16/2458* (2019.01); *G06F 16/288* (2019.01); *G06F 16/9024* (2019.01)

(58) Field of Classification Search
CPC .............. G06Q 40/125; G06F 16/2458; G06F 16/288; G06F 16/9024
USPC .................................................. 705/1.1–912
See application file for complete search history.

(56) References Cited

U.S. PATENT DOCUMENTS

| | | |
|---|---|---|
| 11,087,412 B1 | 8/2021 | Ho et al. |
| 2019/0354544 A1 | 11/2019 | Hertz et al. |
| 2019/0361925 A1 | 11/2019 | Rogynskyy et al. |

OTHER PUBLICATIONS

International Search Report and Written Opinion issued in corresponding International Application No. PCT/US2022/078118, dated Jan. 10, 2023 (7 pages).

*Primary Examiner* — Jonathan P Ouellette
(74) *Attorney, Agent, or Firm* — Foley & Lardner LLP (57) ABSTRACT

Systems, methods, and computer-readable storage media for using graph theory to identify conflicts of interests between entities. A system can receive first data from a first entity, the first data identifying relationships associated with the first entity, as well as second data from a second entity, the second data identifying relationships associated with the second entity. The system can also receive information about the first and second entity being competitors, and using the first data, second data, and competitor data, construct a knowledge graph regarding the relationships between the entities. The system can then analyze the graph model, resulting in a subset of the graph model which identifies any competitive relationships. This subset can then be output to the first and/or second entity.

16 Claims, 5 Drawing Sheets

SYSTEM AND METHOD FOR GRAPH MODEL COMPUTING

BACKGROUND

1. Technical Field

The present disclosure relates to graph model computing, and more specifically to identifying and displaying conflicts of interests within computer graph models.

2. Introduction

Data analytics can provide insight into many different areas, for example, into an entities operations. However, the vast amount of data that is collected cannot be readily processed and analyzed into a useable form. Computer graph modeling may be used to show the conditional dependence between random variables. With employment/labor relationships, a conflict of interest often refers to conflicts between an employee's personal interests and his/her job responsibilities or employee identification. In other words, while "dedication" is a basic requirement for employees, employees may nevertheless be driven by personal interests to make decisions or actions that are contrary to this basic requirement. In other cases, employees and/or employers may be unaware that conflicts exist, and be unknowingly acting with in a conflicting manner.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a computing system across a network from a first entity, a first list of data, each item in the first list of data having a first relationship to the first entity; receiving, at the computing system across the network from a second entity, a second list of data, each item in the second list of data having a second relationship to the second entity; receiving, at the computing system, a list of competitive entities, wherein the first entity is a competitor to the second entity; creating, via a processor of the computer system executing a graph model generator, a graph model of the first list of data, the second list of data, and the list of competitive entities; analyzing, via the processor, the graph model, resulting in a subset of the graph model which identifies at least one competitive relationship; creating a subset of the graph model illustrating the at least one competitive relationship; and outputting, via the processor to a display device, the subset of the graph model.

A system configured to perform the concepts disclosed herein can include: a processor; a graph network comprising: first level nodes respectfully respectively associated with each item in a first list of data and a second list of data; second level nodes which have a higher hierarchical value than the first level nodes; first edge types connecting respective first level nodes with at least one of the second level nodes based on at least one of a first relationship and a second relationship; and a second edge type between at least two second level nodes based on a list of competitive entities; and a non-transitory computer-readable storage medium having instructions stored which, when executed by the processor, cause the processor to perform operations comprising: analyzing the graph network, resulting in a subset of the graph network which identifies at least one competitive relationship in which at least two second level nodes are connected by the second edge type and the at least two second level nodes are connected by first edge type edges to at least one common first level node; creating a subset of the graph network illustrating the at least one competitive relationship; and outputting, to a display device, the subset of the graph network.

A non-transitory computer-readable storage medium configured as disclosed herein can have instructions stored which, when executed by a computing device, cause the computing device to perform operations which include: receiving, across a network from a first entity, a first list of data, each item in the first list of data having a first relationship to the first entity; receiving, across the network from a second entity, a second list of data, each item in the second list of data having a second relationship to the second entity; receiving a list of competitive entities, wherein the first entity is a competitor to the second entity; executing a graph model generator, wherein inputs comprise the first list of data, the second list of data, and the list of competitive entities, resulting in a graph model; analyzing the graph model, resulting in a subset of the graph model which identifies at least one competitive relationship; creating a subset of the graph model illustrating the at least one competitive relationship; and outputting, to a display device, the subset of the graph model.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

In computer graph modeling a directed graph (or digraph) is a graph that is made up of a set of vertices connected by edges, where the edges have a direction associated with them. In computer science, graphs are used to represent networks of communication, data organization, computational devices, the flow of computation, etc. For instance, the link structure of a website can be represented by a directed graph, in which the vertices represent web pages and directed edges represent links from one page to another. A similar approach can be taken to problems in social media, travel, biology, computer chip design, mapping the progression of neurodegenerative diseases, and many other fields.

To build the graph, the data can be exported from one or more relational databases, then transformed into nodes/edges which are connected, forming the graph.

The development of algorithms to handle graphs is therefore of major interest in computer science. The transformation of graphs is often formalized and represented by graph rewrite systems. Complementary to graph transformation systems focusing on rule-based in-memory manipulation of graphs are graph databases geared towards transaction-safe, persistent storing, and querying of graph-structured data.

In some configurations, the entities, and sub-entities, formed within the graph hierarchy as nodes can be companies, non-profits, governmental organizations, non-governmental organizations (NGOs), and employees associated with those entities. In such cases, the graph can identify which entities have a competitive relationship, with an edge connecting the respective nodes, the edge having metadata identifying the competitive relationship. There may also be cases where a person works for more than one company, where those companies are not competitors. In these cases, there will not represent a conflict since the entities associated with those companies would not have a competitor relationship between them in the graph. For instance, a barman can work in different restaurants during the week, but an IT developer may be prohibited from working as an IT developer for another IT company. In some configurations, the sub-entities within the graph may not represent people working for the higher entities within the graph hierarchy, but instead represent data, projects, subsidiaries, and/or other entities in which the "higher" entity may have a proprietary interest. Benefits of using the graph, rather than identifying competitors using a table or chart, include providing information related to trends and comparisons via a global view of the data, rather than a chart. That is, by transforming the data into a graph the entirety of the data can be visualized at once. It also allows members of the audience, who may be less versed in numerical analysis, to follow the information and understand the presentation of the data more fully. Similarly, graphs provide a visual version of data, which can be helpful for visual learners and decision maker which may not fully understand the analysis process and the domain. Additional benefits include providing interpretability and scalability in terms of volume and data processing when interpreting the data associated with millions of interconnected entities. In addition, graph databases (such as Neo4J) and low representations (such as networks) are optimized to execute graph algorithms more efficiently than relational databases.

In exemplary embodiments of the invention, systems and methods disclosed herein can identify employees with external positions from competitor companies in the same industry type, which represent contract violation and thus provide actionable support to avoid such condition and reduce the cost of lawsuits and protect eventual intellectual property and/or specific know-how acquired from the source company.

A "conflicts of interest" with regard to an employer or employee can cover several different types of conflict:
1) External employment or holding an external interest. A common case is that employee establishes a labor relationship with another employer, holding an external position, or the employee's interested person works for the business partner or competitor of the employer, or the employee or his/her interested person invests in or establish a competitive business;
2) Self-dealing, where an employee takes advantage of the information or power gained in his/her position, inducing the employer to trade or cooperate with the company controlled by himself/herself or his/her interested person;
3) Plundering trade opportunities, usually refers to that employee takes advantage of his/her position to transfer the trade opportunities of the employer to a third party and make personal profit therein, most commonly by "flying orders";
4) Internal employment conflict, in which a marriage or kinship exists between two internal employees, which results in one party using or likely to use his/her power for the benefit of another; and
5) A conflict of interest in a broad sense also includes job grabbing and commercial bribery.

However, conflicts of interest analyses can also exist outside of employment arrangements, and can focus on entities and/or modules/components/data used by those entities. For example, company A may be relying on data produced by company B, which is a competitor. While there may not be a legal prohibition on company A using a competitor's data, a potential conflict of interest nevertheless exists.

Regardless of the context surrounding a given conflict, key factors associated with identifying a conflict can include (1) a list of the relationships of given entities with employees, data, etc.; and (2) a list of competitor relationships between the given entities. However, such data is often restricted. For example, a given entity may not want to provide their competitor(s) a list of all proprietary relationships. Systems and methods configured as disclosed herein can overcome this problem by using a system which can analyze the relationships and determine if a conflict exists. The system can then communicate with one or more of the conflicting entities regarding the detected conflict.

Having defined the graph structure, with a hierarchy of nodes associated with entities and various sub-notes connected via edges to those entities, the system can run an interference analysis and provide the results as recommendations, insights, or alerts to the respective entities. For example, once the graph is defined, the system can identify if any sub-node has a relationship with two or more entities which are respectively linked by a "competitor" edge. Preferably, this recommendation/insight takes the form of a graphic illustrating the relationships in question, and where the conflict is occurring. The system can also provide an (almost) just-in-time warning triggered as soon as the violation describes above occurs, or as soon as the violation is detected. In some configurations, the system can include other calculations to provide information regarding the strength of the relationship between entities. For example, the system can calculate a strength of an employee's relationship with a given company. The system can also help to prioritize conflict of interest detection, and can help improve the process of identifying such conflicts when detected by determining where conflicts continue to arise, then recommending additional conflict checks with those respective entities.

In some configurations, it may be preferred that the system be performed by a neutral third party. For example, a company handling payroll for various entities can identify employees receiving payroll funds from a first classification of entities. The company handling payroll can also receive a list of competitive relationships between those first classification entities. The company handling payroll can enter all of this information into the system, which can build a graph using the identified relationships between employees and employers. The system can then execute an algorithm which identifies nodes within the graph simultaneously connected to two competitive entities, indicating one or more individuals are receiving funds from two or more competitors. The system can then create a sub-graph illustrating the conflicts of interest, and provide that sub-graph to the entities and/or other interested parties.

Figure 1:
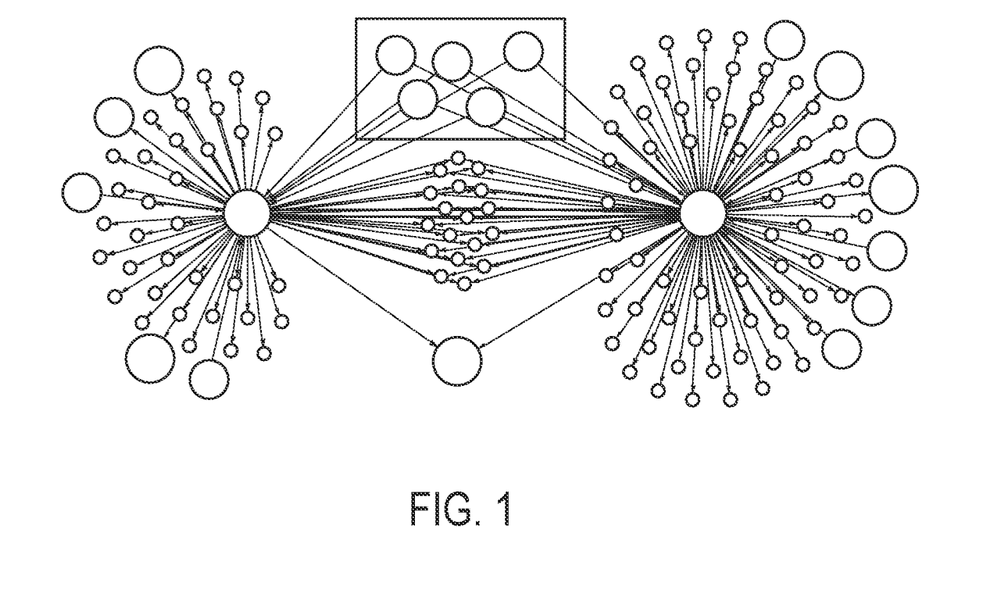
FIG. 1 illustrates an example graph of different entities, some of which have common sub-nodes.

FIG. 1 illustrates an example electronic graph of different entities, some of which have common sub-nodes. As illustrated, the graph represents different entities which are being graphed, with various sub-entities connected/related via edges. As illustrated, the edges are directional, with an arrow pointing from one entity to another, however in other configurations the edges may also be non-directional or bi-directional. As illustrated, there are five sub-entities (within the box at the top of the figure) which are each related to more than one entity—the "hub" node on the left and the hub node on the right. In this illustration, there is no edge or other indication that the left and right hub nodes are competitors, which would result in a conflict of interest for the five sub-entities. If the left and right hub nodes are competitors, the system can insert an edge linking the left and right hub nodes, with the connecting edge identifying an 'is_competitor' relationship between them. This new, updated graph relationship would clearly show a situation of conflict of interest for the sub-entities since the sub-entities would be linked to both the left and right hub nodes which are linked by a "is_competitor" edge. This new, updated graph can be used to map and distinguish conflicts between entity resources.

Figure 2:
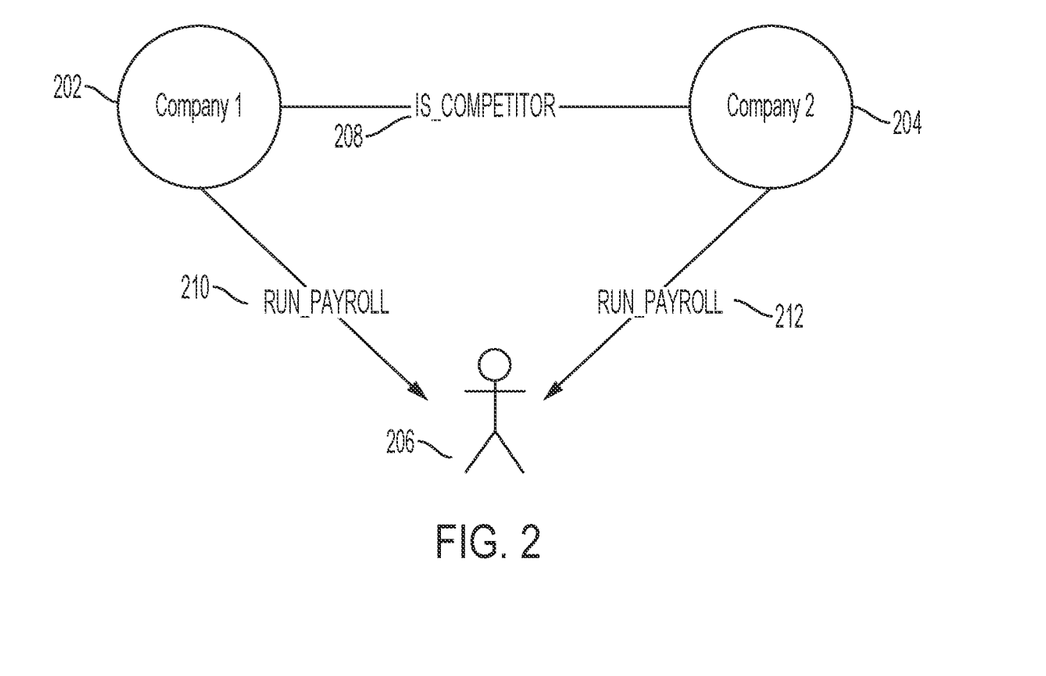
FIG. 2 illustrates an example graph illustrating identification of an individual employed by two competitors.

FIG. 2 illustrates an example graph illustrating identification of an individual employed by two competitors. In this example, the system has built a DiGraph representing the payroll domain for two distinct companies and their associates/employees. As illustrated, a graph schema defines entities called "Company 1" 202 and "Company 2" 204, and each of them has an attribute (which may be internal/metadata) called IndustryType from which the system can determine that the entities operate in the same marketplace. The system can then create a relationship in the form of an edge called "IS_COMPETITOR" 208 between them, identifying within the graph that these companies are rivals in the same segment of the market. The system collects payroll data related to each associate 206 which the companies 202, 204 respectively employ, and with this information, the system creates relationships (edges) called RUN_PAYROLL 210, 212, such that the graph contains links to each employee associated with each company 202, 204 that performs payroll processing using the system. In most cases, one single employee will be paid by only one company. However, in cases where an employee 206 is paid by more than one company, and if those companies are direct competitors, there is strong evidence of a conflict. Such is the case here, where the employee 206 has relationships 210, 212 with both companies 202, 204.

Figure 3:
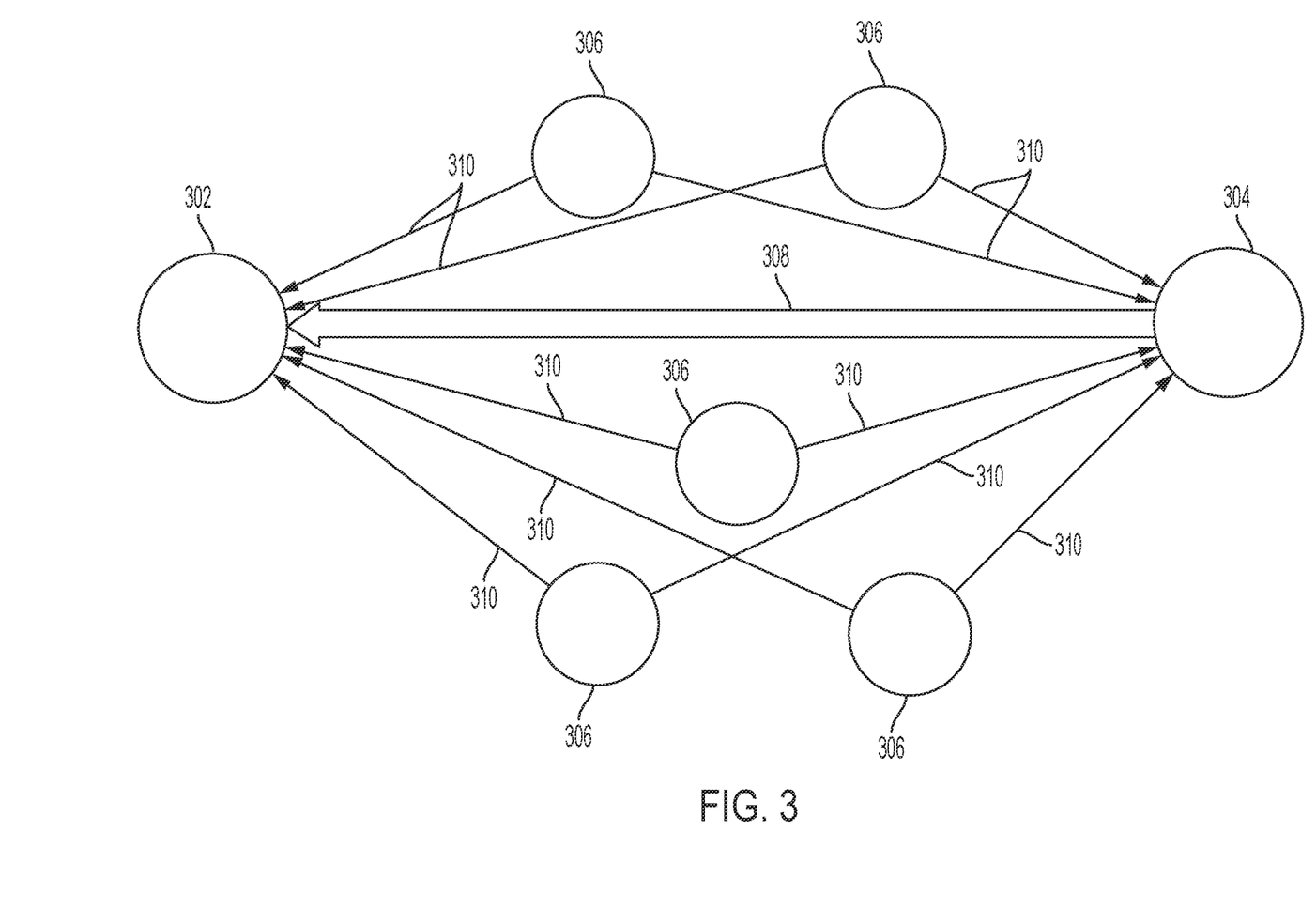
FIG. 3 illustrates an example graph illustrating an asymmetrical competitor system with multiple sub-nodes engaged with both entities.

FIG. 3 illustrates an example graph illustrating an asymmetrical competitor system with multiple sub-nodes engaged with both entities. In this example, a first entity 302 and a second entity 304 have multiple sub-entities 306 with ties/relationships/edges 310 connecting the sub-entities to both the first entity 302 and the second entity 304. However, in this example, the competitor relationship edge 308 is asymmetrical, such that the second entity 304 considers the first entity 302 to be a competitor (illustrated by the arrow of the competitor edge 308 pointing to the first entity 302), while the first entity 302 does not consider the second entity 304 to be a competitor (illustrated by the lack of an arrow pointing to the second entity on the competitor edge 308). In such a circumstance, the graph can illustrate that the second entity 304 may consider the sub-entities 306 to have a conflict of interest, however the first entity 302 would not consider the sub-entities to have any such conflict. For example, based on the source dataset, the system can identify a symmetrical competitor relationship specifically for those cases where both companies are competitors of one other. However, there could be cases where the company A is competitor of B, but B is not strongly competing with A. In such cases the system can define an asymmetric relationships between A and B.

Figure 4:
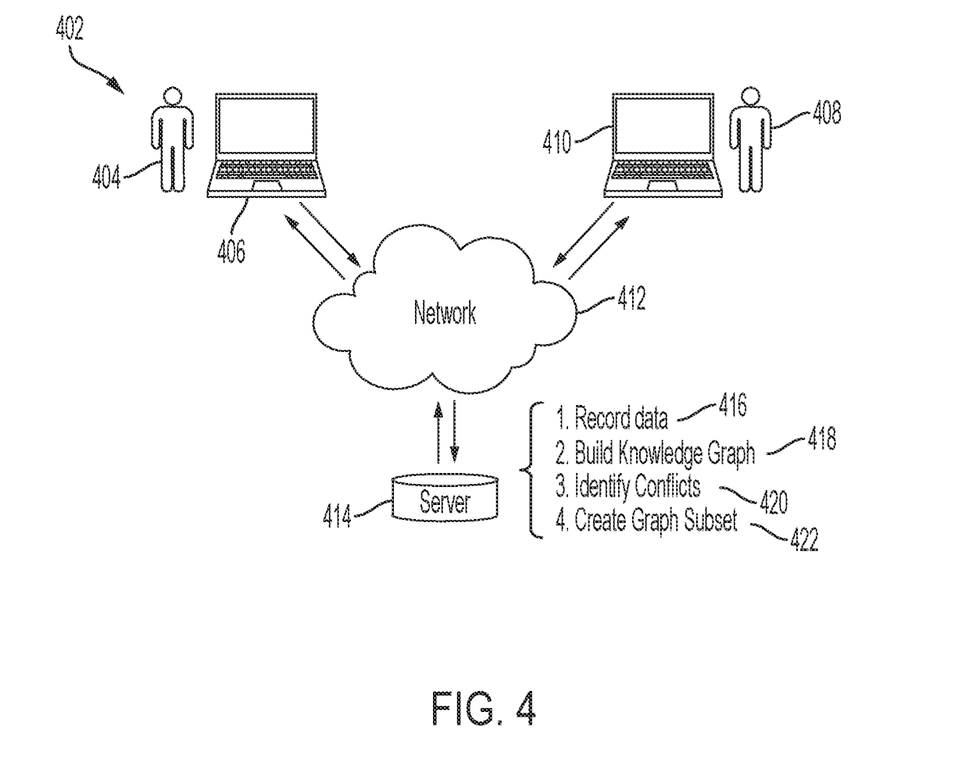
FIG. 4 illustrates an example system configuration.

FIG. 4 illustrates an example system configuration 402. As illustrated, a user 404 interacts with a computer 406, providing information across a network 412 to a server 414 across a network 412. This information can include, for example, data about the user's 404 respective company, institution, organization, etc. For example, the user 404 may provide data about the employees for their company to the server 414. Another user 408, from a different organization or company, similarly interacts with the server 414 via a computer communicating via a network 412. The server 414, upon receiving the information from the users 402, 408, records the data 416 in a database. The server 414 then builds a knowledge graph 418, identifies conflicts within that knowledge graph 420, and creates a graph subset 422 illustrating the conflict. The server 414 can then transmit the graph subset to one or both of the users 402, 408 across the network, thereby informing the users 402, 408 of the identified conflict(s).

Figure 5:
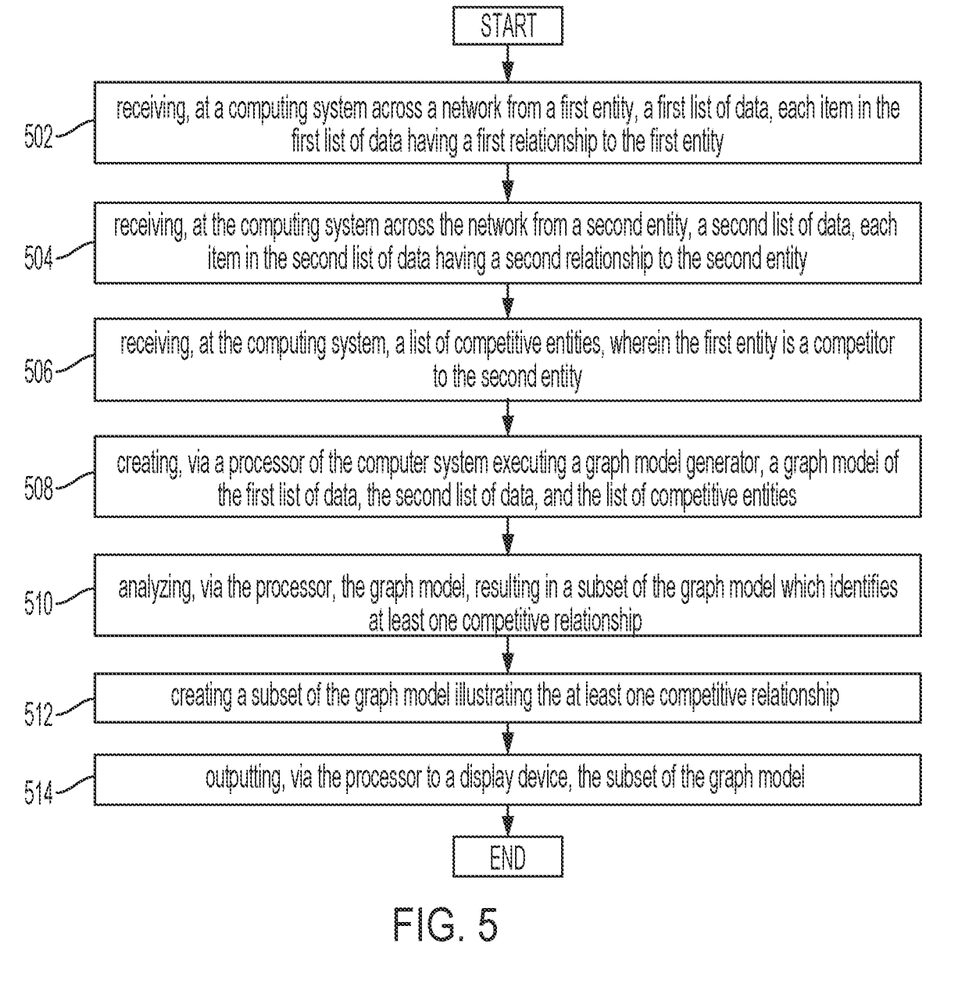
FIG. 5 illustrates an example method embodiment.

FIG. 5 illustrates an example method embodiment. As illustrated, the system receives, at a computing system across a network from a first entity, a first list of data, each item in the first list of data having a first relationship to the first entity (502). The system also receives, at the computing system across the network from a second entity, a second list of data, each item in the second list of data having a second relationship to the second entity (504), and a list of competitive entities, wherein the first entity is a competitor to the second entity (506). Steps 502, 504, and 506 can occur sequentially or in parallel, depending on the specific system configuration.

The system then creates, via a processor of the computer system executing a graph model generator, a graph model of the first list of data, the second list of data, and the list of competitive entities (508), and analyzes, via the processor, the graph model, resulting in a subset of the graph model which identifies at least one competitive relationship (510). The system then creates a subset of the graph model illustrating the at least one competitive relationship (512) and outputs, via the processor to a display device, the subset of the graph model (514).

In some configurations, the list of competitive entities has at least one one-way directional relationship.

In some configurations, the graph model generator creates first level nodes associated with each item in the first list of data and the second list of data; the graph model generator creates second level nodes associated with the first entity and the second entity; the graph model generator creates first edge types between first level nodes and the second level nodes based on the first relationship and the second relationship; and the graph model generator creates a second edge type between at least two second level nodes based on the list of competitive entities.

In some configurations, the analyzing which results in the subset comprises at least one cypher query, where the cypher query relies on components and a database built using graph theory.

In some configurations, he first list of data and the second list of data comprise employee identification information. Such information can include names, titles, social security number, payroll identification number, salary, hourly rate, security authorizations, and/or project associations. Moreover, in such configurations, the subset of the graph model can include at least one node associated with an employee, the at least one node connected by a first edge to a first node associated with the first entity and connected by a second edge to a second node associated with the second entity.

In some configurations, the computing system is operated by a third entity, the third entity being distinct from the first entity and the second entity. For example, the third entity can be a payroll processing company which has no conflicts with the first or second entities. In such an example, the third entity can perform payroll processing for the first entity and the second entity.

Figure 6:
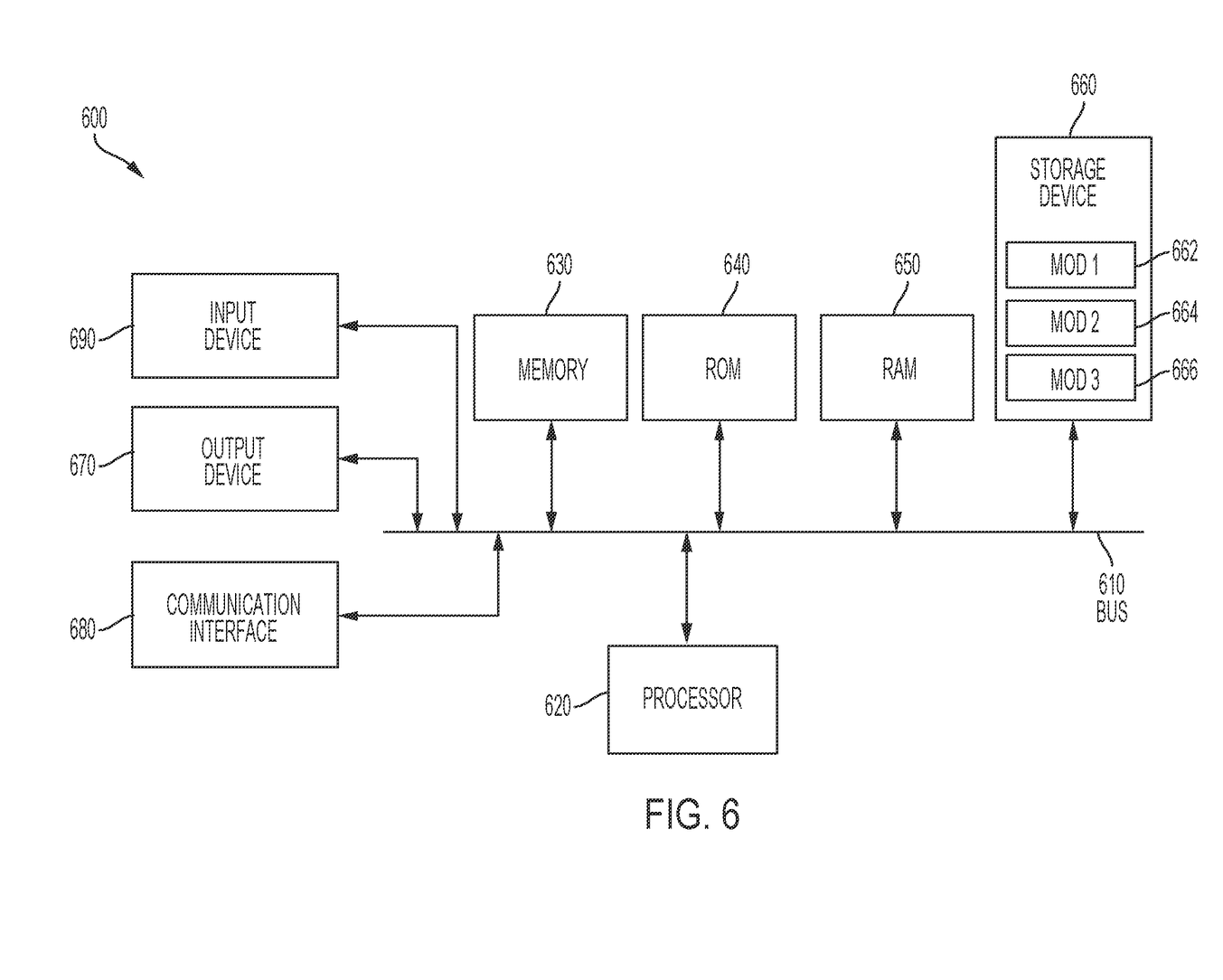
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:
   performing, by a computing system operated by a third entity, payroll processing for a first entity and a second entity different from the third entity;
   receiving, by the computing system, across a network from the first entity, a first list of data corresponding to first payroll information, wherein each item in the first list of data is associated with a respective first identifier having a first relationship to the first entity;

receiving, by the computing system, across the network from the second entity, a second list of data corresponding to second payroll information, wherein each item in the second list of data is associated with a respective second identifier having a second relationship to the second entity;

receiving, by the computing system, a list of competitive entities that indicates: i) the first entity is a competitor to the second entity, ii) the third entity is a noncompetitor to the first entity, and iii) the third entity is a noncompetitor to the second entity;

creating, by the computing system, by executing a graph model generator, a graph model of the first list of data, the second list of data, and the list of competitive entities;

constructing, by the computing system, a database in accordance with the graph model of the first list of data, the second list of data, and the list of competitive entities;

executing, by the computing system, to identify one more conflicting relationships, at least one cypher query on the database constructed in accordance with the graph model of the first list of data, the second list of data, and the list of competitive entities;

selecting, by the computing system, responsive to execution of the at least one cypher query on the database, a subset of the graph model that identifies at least one competitive relationship indicative of a conflict between at least one pair of the respective first identifier related to the first payroll information and the respective second identifier related to the second payroll information;

creating, by the computing system, a graphic illustration of the subset of the graph model indicating the at least one competitive relationship;

outputting, by the computing system, to a display device, a first display comprising the graphic illustration of the subset of the graph model; and outputting, by the computing system, to the display device, a second display, the second display illustrative of the at least one competitive relationship between the at least one pair of the respective first identifier and the respective second identifier.

2. The method of claim 1, wherein the list of competitive entities has at least one one-way directional relationship.

3. The method of claim 1, wherein:
the graph model generator creates first level nodes associated with each item in the first list of data and the second list of data;
the graph model generator creates second level nodes associated with the first entity and the second entity;
the graph model generator creates first edge types between the first level nodes and the second level nodes based on the first relationship and the second relationship; and
the graph model generator creates a second edge type between at least two second level nodes based on the list of competitive entities.

4. The method of claim 1, wherein the first list of data and the second list of data comprise employee identification information.

5. The method of claim 4, wherein the subset of the graph model comprises at least one node associated with an employee, the at least one node connected by a first edge to a first node associated with the first entity and connected by a second edge to a second node associated with the second entity.

6. The method of claim 1, wherein the third entity performs the payroll processing for the first entity and the second entity.

7. A system comprising:
one or more processors;
a graph network comprising:
first level nodes respectfully associated with each item in a first list of data corresponding to first payroll information and a second list of data corresponding to second payroll information;
second level nodes with a higher hierarchical value than the first level nodes, wherein each item in the first list of data is associated with a respective first identifier having a first relationship to a respective first one of the second level nodes, wherein each item in the second list of data is associated with a respective second identifier having a second relationship to a respective second one of the second level nodes, and wherein a third one of the second level nodes performs payroll processing for the second level nodes;
first edge types connecting the respective first level nodes with at least one of the second level nodes based on at least one of the first relationship or the second relationship; and
a second edge type between at least two second level nodes based on a list of competitive entities that indicates: i) the first one of the second level nodes is a competitor to the second one of the second level nodes, ii) the third one of the second level nodes is a noncompetitor to the first one of the second level nodes, and iii) the third one of the second level nodes is a noncompetitor to the second one of the second level nodes; and
a non-transitory computer-readable storage medium having instructions stored which, when executed by the processor, cause the one or more processors to perform operations comprising:
executing at least one cypher query on a database constructed in accordance with the graph network of the first list of data, the second list of data, and the list of competitive entities;
selecting, responsive to execution of the at least one cypher query on the database, a subset of the graph network that identifies at least one competitive relationship in which the at least two second level nodes are connected by the second edge type and the at least two second level nodes are connected by first edge type edges to at least one common first level node indicative of a conflict between at least one pair of the respective first identifier related to the first payroll information and the respective second identifier related to the second payroll information;
creating the subset of the graph network illustrating the at least one competitive relationship;
outputting, to a display device, a first display comprising the subset of the graph network; and
outputting, to the display device, a second display comprising the at least one competitive relationship between the at least one pair of the respective first identifier and the respective second identifier.

8. The system of claim 7, wherein the list of competitive entities has at least one one-way relationship.

9. The system of claim 7, wherein:
the first level nodes represent employees;
the first list of data and the second list of data comprise employee identification information; and
the second level nodes represent employers.

10. The system of claim 9, wherein the subset of the graph network comprises at least one node associated with an employee, the at least one node connected by a first edge to a first node associated with a first entity of the second level nodes and connected by a second edge to a second node associated with a second entity of the second level nodes.

11. The system of claim 7, wherein the system is operated by a third entity illustrated as the third one of the second level nodes within the graph network, the third entity being distinct from any entity identified by the second level nodes.

12. The system of claim 11, wherein the third entity performs the payroll processing for entities illustrated as the second level nodes within the graph network.

13. A non-transitory computer-readable storage medium having instructions stored which, when executed by a processor operated by a third entity, cause the processor to perform operations comprising:
   performing payroll processing for a first entity and a second entity different from the third entity;
   receiving, across a network from the first entity, a first list of data corresponding to first payroll information, wherein each item in the first list of data is associated with a respective first identifier having a first relationship to the first entity;
   receiving, across the network from the second entity, a second list of data corresponding to second payroll information, wherein each item in the second list of data is associated with a respective second identifier having a second relationship to the second entity;
   receiving a list of competitive entities that indicates: i) the first entity is a competitor to the second entity, ii) the third entity is a noncompetitor to the first entity, and iii) the third entity is a noncompetitor to the second entity;
   executing a graph model generator, wherein inputs comprise the first list of data, the second list of data, and the list of competitive entities;
   creating, in response to executing the graph model generator, a graph model of the first list of data, the second list of data, and the list of competitive entities;
   constructing a database in accordance with the graph model of the first list of data, the second list of data, and the list of competitive entities;
   executing at least one cypher query on the database;
   selecting, responsive to execution of the at least one cypher query on the database, a subset of the graph model that identifies at least one competitive relationship indicative of a conflict between at least one pair of the respective first identifier related to the first payroll information and the respective second identifier related to the second payroll information;
   creating the subset of the graph model illustrating the at least one competitive relationship; outputting, to a display device, a first display comprising the subset of the graph model; and
   outputting, to the display device, a second display comprising the at least one competitive relationship between the at least one pair of the respective first identifier and the respective second identifier.

14. The non-transitory computer-readable storage medium of claim 13, wherein the list of competitive entities has at least one one-way directional relationship.

15. The non-transitory computer-readable storage medium of claim 13, wherein:
   the graph model generator creates first level nodes associated with each item in the first list of data and the second list of data;
   the graph model generator creates second level nodes associated with the first entity and the second entity;
   the graph model generator creates first edge types between the first level nodes and the second level nodes based on the first relationship and the second relationship; and
   the graph model generator creates a second edge type between at least two second level nodes based on the list of competitive entities.

16. The non-transitory computer-readable storage medium of claim 13, wherein the first list of data and the second list of data comprise employee identification information.

* * * * *